US009020746B2

(12) United States Patent
Aono

(10) Patent No.: US 9,020,746 B2
(45) Date of Patent: Apr. 28, 2015

(54) VEHICLE-MOUNTED INFORMATION PROCESSING APPARATUS AND INFORMATION PROCESSING METHOD

(75) Inventor: Hiroyuki Aono, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 6 days.

(21) Appl. No.: 13/132,463

(22) PCT Filed: Feb. 25, 2009

(86) PCT No.: PCT/JP2009/053434
§ 371 (c)(1),
(2), (4) Date: Jun. 2, 2011

(87) PCT Pub. No.: WO2010/097916
PCT Pub. Date: Sep. 2, 2010

(65) Prior Publication Data
US 2011/0301844 A1    Dec. 8, 2011

(51) Int. Cl.
*G06F 17/00* (2006.01)
*G08G 1/16* (2006.01)
*G01S 13/93* (2006.01)

(52) U.S. Cl.
CPC .............. *G08G 1/161* (2013.01); *G01S 13/931* (2013.01); *G01S 2013/936* (2013.01)

(58) Field of Classification Search
USPC ......................................................... 701/300
See application file for complete search history.

(56) References Cited

U.S. PATENT DOCUMENTS 6,707,378 B2 *   3/2004   MacNeille et al. ........... 340/435

7,215,254 B2 *   5/2007   Tauchi ........................ 340/903

(Continued)

FOREIGN PATENT DOCUMENTS

JP    A-07-334792    12/1995
JP    A 2001-289642    10/2001

(Continued)

OTHER PUBLICATIONS

International Search Report issued in Application No. PCT/JP2009/053434; Dated Jun. 2, 2009 (With Translation).

(Continued)

*Primary Examiner* — John R Olszewski
*Assistant Examiner* — Jean-Paul Cass
(74) *Attorney, Agent, or Firm* — Oliff PLC

(57) ABSTRACT

An object of the invention is to provide a vehicle-mounted information processing apparatus capable of specifying the position of another vehicle with high accuracy using information related to the distance between another vehicle and an intersection point. The vehicle-mounted information processing apparatus includes: a map information storage unit (11) that stores map information including position information of a road and an intersection point; an inter-vehicle communication unit (4) that acquires various kinds of information using inter-vehicle communication with another vehicle; an another-vehicle GPS information acquiring unit (13) that acquires GPS information related to the position of another vehicle and acquires first reference intersection point distance information related to a distance between another vehicle and a first reference intersection point which is recognized by another vehicle as an intersection point that is in front of another vehicle and is closest to another vehicle, through the inter-vehicle communication unit (4); and an another-vehicle position specifying unit (16) that specifies the position of another vehicle on the basis of the GPS information, the map information, and the first reference intersection point distance information.

12 Claims, 6 Drawing Sheets

(56) References Cited

U.S. PATENT DOCUMENTS

| | | | |
|---|---|---|---|
| 7,239,252 B2* | 7/2007 | Kato | 340/932.2 |
| 7,443,314 B2* | 10/2008 | Konishi et al. | 340/903 |
| 7,444,240 B2* | 10/2008 | Macneille et al. | 701/300 |
| 7,545,261 B1* | 6/2009 | Harrington | 340/435 |
| 7,610,146 B2* | 10/2009 | Breed | 701/514 |
| 7,672,270 B2* | 3/2010 | Roggero et al. | 370/328 |
| RE41,410 E* | 6/2010 | Seki | 701/70 |
| 7,774,137 B2* | 8/2010 | Thorne | 701/301 |
| 7,840,342 B1* | 11/2010 | Breed | 701/414 |
| 7,848,884 B2* | 12/2010 | Kawasaki | 701/301 |
| 7,848,886 B2* | 12/2010 | Kawasaki | 701/301 |
| 7,912,645 B2* | 3/2011 | Breed et al. | 701/300 |
| 8,077,077 B2* | 12/2011 | Sakuma | 342/70 |
| 8,204,642 B2* | 6/2012 | Tanaka et al. | 701/28 |
| 8,204,678 B2* | 6/2012 | Matsuno | 701/300 |
| 8,229,663 B2* | 7/2012 | Zeng et al. | 701/301 |
| 2004/0193372 A1* | 9/2004 | MacNeille et al. | 701/213 |
| 2006/0293819 A1* | 12/2006 | Harumoto et al. | 701/41 |
| 2007/0085737 A1* | 4/2007 | Eslinger et al. | 342/357.03 |
| 2007/0168129 A1* | 7/2007 | Thorne | 701/301 |
| 2007/0213927 A1 | 9/2007 | Ishigami et al. | |
| 2007/0282532 A1 | 12/2007 | Yamamoto et al. | |
| 2008/0015771 A1* | 1/2008 | Breed et al. | 701/207 |
| 2008/0052000 A1* | 2/2008 | Furstenberg | 701/214 |
| 2008/0167819 A1* | 7/2008 | Breed | 701/300 |
| 2008/0238771 A1* | 10/2008 | Katayama et al. | 342/357.14 |
| 2008/0309550 A1* | 12/2008 | Sairo et al. | 342/357.1 |
| 2011/0037647 A1* | 2/2011 | Tajima et al. | 342/357.26 |
| 2011/0144911 A1* | 6/2011 | Madhavan et al. | 701/214 |

FOREIGN PATENT DOCUMENTS

| | | |
|---|---|---|
| JP | A 2003-337029 | 11/2003 |
| JP | A-2004-251790 | 9/2004 |
| JP | A 2005-328283 | 11/2005 |
| JP | A-2006-242754 | 9/2006 |
| JP | A-2007-085909 | 4/2007 |
| JP | A-2007-094698 | 4/2007 |
| JP | A-2007-271602 | 10/2007 |
| JP | A-2008-065480 | 3/2008 |
| JP | A-2008-065483 | 3/2008 |
| JP | A-2008-089353 | 4/2008 |
| JP | A-2008-269426 | 11/2008 |

OTHER PUBLICATIONS

Aug. 24, 2012 European Search Report issued in European Patent Application No. 09840769.5.
International Preliminary Report on Patentability issued in Application No. PCT/JP2009/053434; Dated Oct. 27, 2011.

* cited by examiner

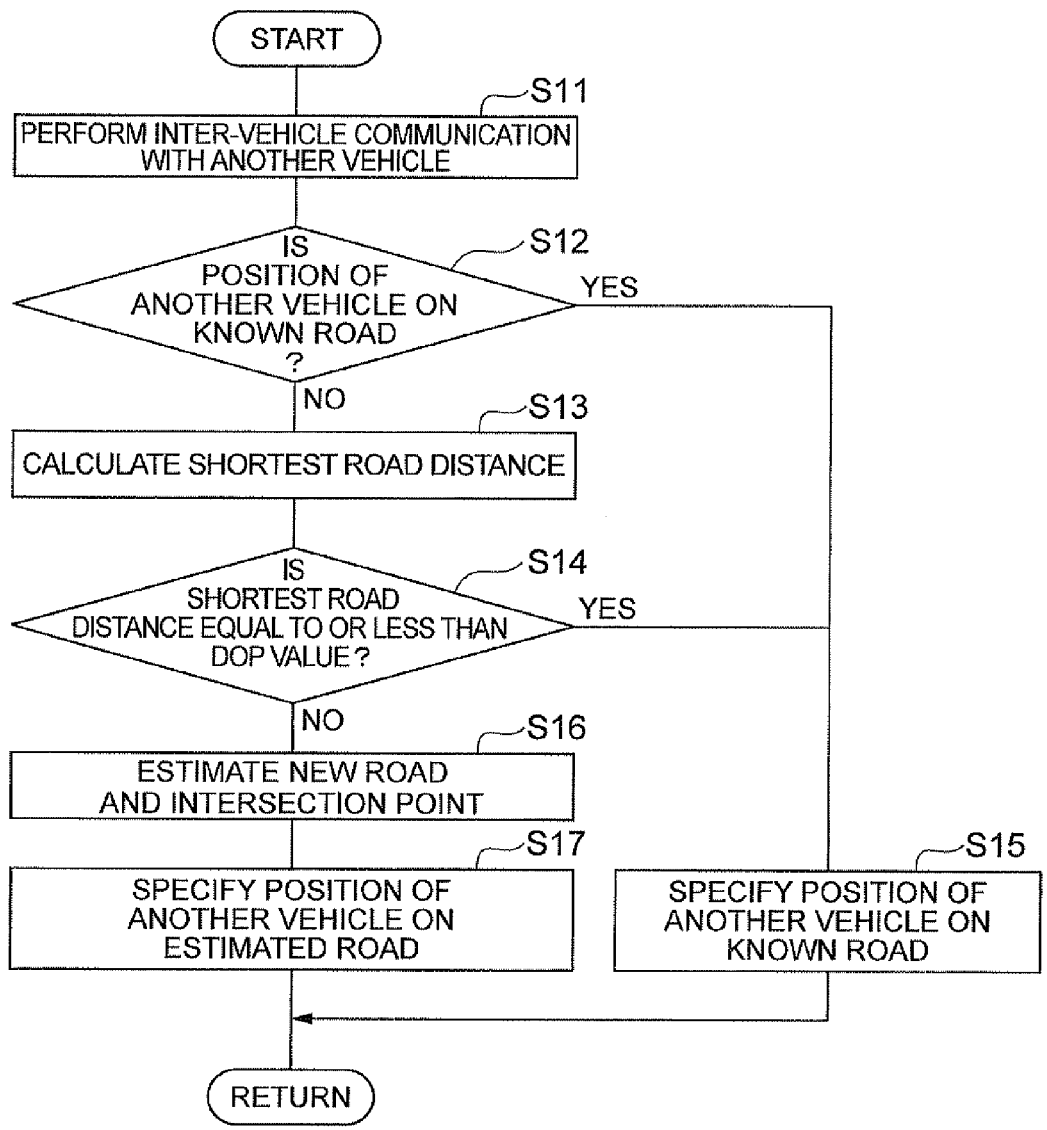

VEHICLE-MOUNTED INFORMATION PROCESSING APPARATUS AND INFORMATION PROCESSING METHOD

TECHNICAL FIELD

The present invention relates to a vehicle-mounted information processing apparatus and an information processing method that specify the position of another vehicle.

BACKGROUND ART

As a technique in this field, there is Japanese Unexamined Patent Application Publication No. 2007-85909. Japanese Unexamined Patent Application Publication No. 2007-85909 discloses an apparatus for detecting the position of another vehicle. The apparatus calculates an error in the GPS position information of a host vehicle in advance, using map matching between the GPS position information of the host vehicle and map information. When the GPS position information of another vehicle is acquired, the apparatus estimates the calculated error as an error in the GPS position information of another vehicle and corrects the error. In this way, it is possible to rapidly detect the position of another vehicle.

Patent Literature 1: Japanese Unexamined Patent Application Publication No. 2007-85909

SUMMARY OF INVENTION

Technical Problem

However, for example, in order to predict the possibility of a crash at an intersection point or determine communication timing in inter-vehicle communication, it is preferable to improve the detection accuracy of the position of another vehicle. In the apparatus for detecting the position of another vehicle according to the related art, correction is performed using the error in the GPS position information, thereby detecting the position of another vehicle. However, it is not easy to ensure sufficient detection accuracy for use.

An object of the invention is to provide a vehicle-mounted information processing apparatus and an information processing method capable of specifying the position of another vehicle with high accuracy using information related to the distance between the another vehicle and an intersection point.

Solution to Problem

According to an aspect of the invention, a vehicle-mounted information processing apparatus includes: map information storage means for storing map information including position information of a road and an intersection point; inter-vehicle communication means for acquiring various kinds of information using inter-vehicle communication with another vehicle; GPS information acquiring means for acquiring GPS information related to the position of another vehicle through the inter-vehicle communication means; first reference intersection point distance information acquiring means for acquiring, through the inter-vehicle communication means, first reference intersection point distance information related to a distance between another vehicle and a first reference intersection point which is recognized by another vehicle as an intersection point that is in front of another vehicle and is closest to another vehicle; and another-vehicle position specifying means for specifying the position of another vehicle on the basis of the GPS information, the map information, and the first reference intersection point distance information.

According to the vehicle-mounted information processing apparatus, map matching using map information is performed on the GPS information that is acquired from another vehicle by inter-vehicle communication. In this way, it is possible to specify the position of another vehicle. In addition, the position of another vehicle is corrected with respect to the position of the first reference intersection point on the basis of the first reference intersection point distance information acquired by inter-vehicle communication. Therefore, it is possible to specify the position of another vehicle with high accuracy.

The vehicle-mounted information processing apparatus according to the above-mentioned aspect may further include GPS error information acquiring means for acquiring GPS error information of another vehicle through the inter-vehicle communication means. The another-vehicle position specifying means may specify the position of another vehicle on the basis of the GPS error information. For example, when a newly constructed road or intersection point is included in the map information of the host vehicle, but is not included in the map information of another vehicle, the host vehicle is likely to erroneously recognize the position of the first reference intersection point and erroneously correct the position of another vehicle. Therefore, the vehicle-mounted information processing apparatus recognizes the error range based on the position of another vehicle included in the GPS information, using the GPS error information. In this way, it is possible to prevent excessive correction over the error range and thus improve the reliability of specifying the position of another vehicle.

The vehicle-mounted information processing apparatus according to the above-mentioned aspect may further include: second reference intersection point distance calculating means for calculating a distance between another vehicle and a second reference intersection point, which is an intersection point that is in front of another vehicle and is closest to another vehicle, on the basis of the GPS information and the map information; reference intersection point difference calculating means for calculating a reference intersection point difference, which is a difference between the distance between the first reference intersection point and another vehicle and the distance between the second reference intersection point and another vehicle; and first reference intersection point position specifying means for specifying the position of the first reference intersection point on the basis of the GPS information and the map information when the reference intersection point difference is not within a GPS error distance in the GPS error information. The another-vehicle position specifying means may specify the position of another vehicle on the basis of information related to the position of the first reference intersection point specified by the first reference intersection point specifying means.

According to the vehicle-mounted information processing apparatus, when the reference intersection point difference is not within the GPS error distance, it is determined that the first reference intersection point recognized by another vehicle is different from the second reference intersection point recognized by the host vehicle, and the first reference intersection point recognized by another vehicle is specified on the basis of the map information and the GPS information of another vehicle. Then, the position of another vehicle is corrected with respect to the position of the specified first reference intersection point, using the first reference intersection point distance information. In this way, it is possible to specify the position of another vehicle with high accuracy.

The vehicle-mounted information processing apparatus according to the above-mentioned aspect may further include: shortest road distance calculating means for calculating the shortest road distance, which is the shortest distance between the position of another vehicle in the GPS information and the road in the map information, when the position of another vehicle in the GPS information is not on a known road included in the map information; and estimating means for estimating the existence of a new intersection point and road on the basis of the GPS information, the map information, and the first reference intersection point distance information when the shortest road distance is not within the GPS error distance in the GPS error information. The another-vehicle position specifying means may specify the position of another vehicle on the road estimated by the estimating means.

According to the vehicle-mounted information processing apparatus, when the shortest road distance of another vehicle is not within the GPS error distance, it is determined that another vehicle is traveling on a road which is not included in the map information of the host vehicle, and the existence of a new intersection point and road is estimated on the basis of the GPS information of another vehicle, the map information, and the first reference intersection point distance information. Then, information related to the estimated intersection point and road is added to the map information, thereby updating the map information. In addition, the position of another vehicle on the estimated road is specified. In this way, it is possible to prevent the position of another vehicle from being forcibly corrected on a known road and thus specify the position of another vehicle with high reliability.

The vehicle-mounted information processing apparatus according to the above-mentioned aspect may further include road-to-vehicle communication means for acquiring third reference intersection point distance information related to a distance between a host vehicle and a third reference intersection point, which is an intersection point that is in front of the host vehicle and is closest to the host vehicle, using road-to-vehicle communication with a road-side communication device. The estimating means may estimate the existence of the new intersection point and road on the basis of the third reference intersection point distance information. According to the vehicle-mounted information processing apparatus, in addition to the GPS information of another vehicle and the map information, the third reference intersection point distance information obtained by road-to-vehicle communication is used. Therefore, it is possible to estimate the position of the road with high reliability. As a result, it is possible to improve the reliability of specifying the position of another vehicle.

According to another aspect of the invention, an information processing method includes: an acquiring step of acquiring GPS information related to the position of another vehicle and acquiring first reference intersection point distance information related to a distance between another vehicle and a first reference intersection point which is recognized by another vehicle as an intersection point that is in front of another vehicle and is closest to another vehicle, using inter-vehicle communication; and an another-vehicle position specifying step of specifying the position of another vehicle on the basis of map information including position information of a road and an intersection point, the GPS information, and the first reference intersection point distance information.

According to the information processing method, map matching using map information is performed on the GPS information that is acquired from another vehicle by inter-vehicle communication. In this way, it is possible to specify the position of another vehicle. In addition, the position of another vehicle is corrected with respect to the position of the first reference intersection point on the basis of the first reference intersection point distance information acquired by inter-vehicle communication. Therefore, it is possible to specify the position of another vehicle with high accuracy.

In the acquiring step, GPS error information of another vehicle may be acquired. In the another-vehicle position specifying step, the position of another vehicle may be specified on the basis of the GPS error information. In the information processing method, the error range based on the position of another vehicle which is included in the GPS information is recognized on the basis of the GPS error information. Therefore, it is possible to prevent excessive correction over the error range and thus improve the reliability of specifying the position of another vehicle.

The information processing method according to the above-mentioned aspect may further include: a second reference intersection point distance calculating step of calculating a distance between another vehicle and a second reference intersection point, which is an intersection point that is in front of another vehicle and is closest to another vehicle, on the basis of the GPS information and the map information; a reference intersection point difference calculating step of calculating a reference intersection point difference, which is a difference between the distance between the first reference intersection point and another vehicle and the distance between the second reference intersection point and another vehicle; and a first reference intersection point position specifying step of specifying the position of the first reference intersection point on the basis of the GPS information and the map information when the reference intersection point difference is not within a GPS error distance in the GPS error information. In the another-vehicle position specifying step, the position of another vehicle may be specified on the basis of information related to the position of the first reference intersection point specified in the first reference intersection point specifying step.

According to the information processing method, when the reference intersection point difference is not within the GPS error distance, it is determined that the first reference intersection point recognized by another vehicle is different from the second reference intersection point recognized by the host vehicle, and the first reference intersection point recognized by another vehicle is specified on the basis of the map information and the GPS information of another vehicle. Then, the position of another vehicle is corrected with respect to the position of the specified first reference intersection point, using the first reference intersection point distance information. In this way, it is possible to specify the position of another vehicle with high accuracy.

The information processing method according to the above-mentioned aspect may further include: a shortest road distance calculating step of calculating the shortest road distance, which is the shortest distance between the position of another vehicle in the GPS information and the road in the map information, when the position of another vehicle in the GPS information is not on a known road included in the map information; and an estimating step of estimating the existence of a new intersection point and road on the basis of the GPS information, the map information, and the first reference intersection point distance information when the shortest road distance is not within the GPS error distance in the GPS error information. In the another-vehicle position specifying step, the position of another vehicle may be specified on the estimated road.

According to the information processing method, when the shortest road distance of another vehicle is not within the GPS error distance, it is determined that another vehicle is traveling on a road which is not included in the map information of the host vehicle, and the existence of a new intersection point and road is estimated on the basis of the GPS information of another vehicle, the map information, and the first reference intersection point distance information. Then, information related to the estimated intersection point and road is added to the map information, thereby updating the map information. In addition, the position of another vehicle on the estimated road is specified. In this way, it is possible to prevent the position of another vehicle from being forcibly corrected on a known road and thus specify the position of another vehicle with high reliability.

The information processing method according to the above-mentioned aspect may further include a road-to-vehicle communication step of acquiring third reference intersection point distance information related to a distance between a host vehicle and a third reference intersection point, which is an intersection point that is in front of the host vehicle and is closest to the host vehicle, using road-to-vehicle communication with a road-side communication device. In the estimating step, the existence of the new intersection point and road may be estimated on the basis of the third reference intersection point distance information. According to the information processing method, in addition to the GPS information of another vehicle and the map information, the third reference intersection point distance information obtained by road-to-vehicle communication is used. Therefore, it is possible to estimate the position of the road with high reliability. As a result, it is possible to improve the reliability of specifying the position of another vehicle.

Advantageous Effects of Invention

According to the invention, it is possible to specify the position of another vehicle with high accuracy using information related to the distance between another vehicle and an intersection point.

BRIEF DESCRIPTION OF DRAWINGS

FIG. 6 is a flowchart illustrating the operation of an ECU shown in FIG. 4.

DESCRIPTION OF EMBODIMENTS

Figure 1:
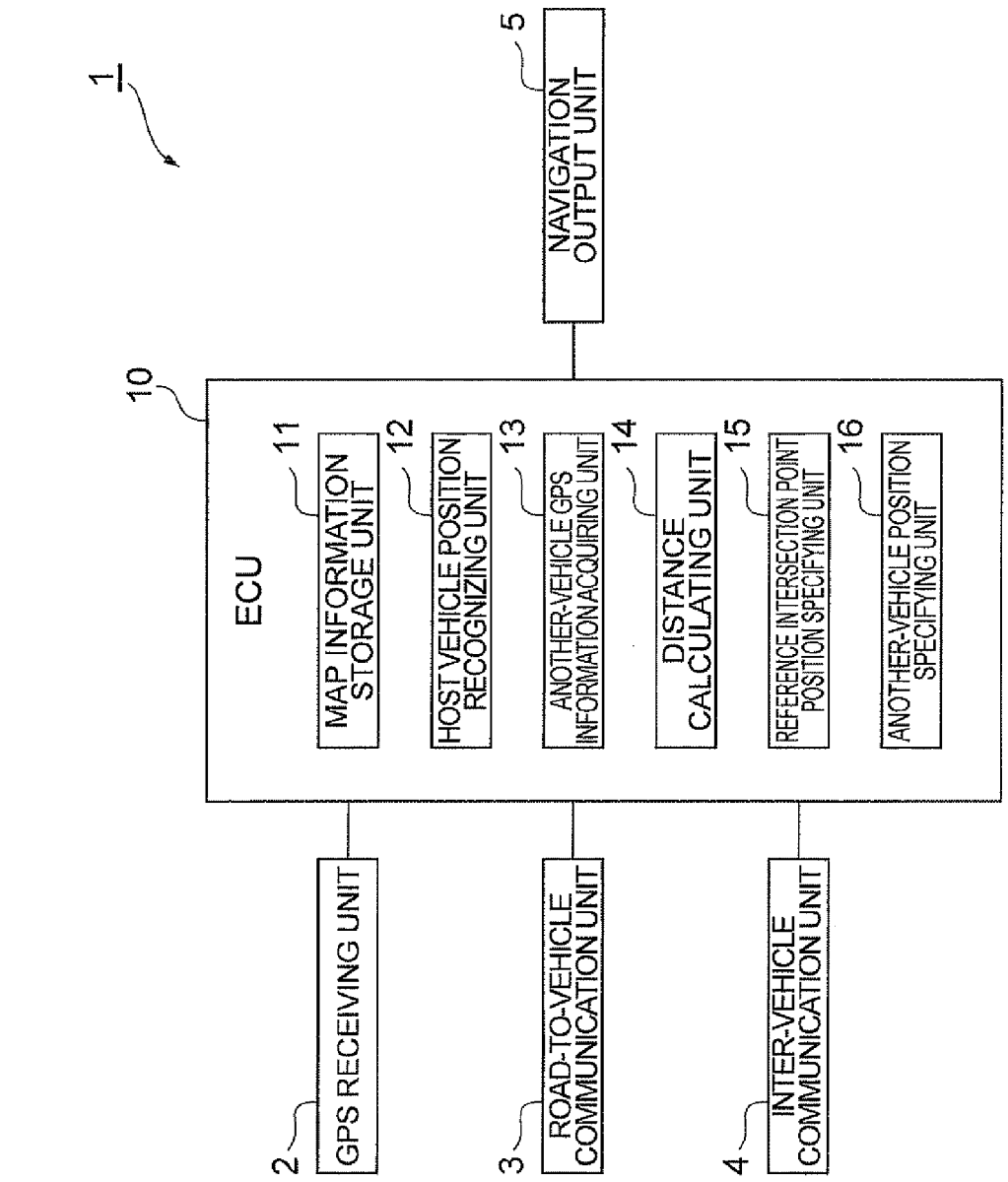
FIG. 1 is a block diagram illustrating a vehicle-mounted information processing apparatus according to a first embodiment.

Hereinafter, vehicle-mounted information processing apparatuses according to exemplary embodiments of the invention will be described in detail with reference to the accompanying drawings. The same components are denoted by the same reference numerals and a description thereof will not be repeated.

First Embodiment

Figure 2:
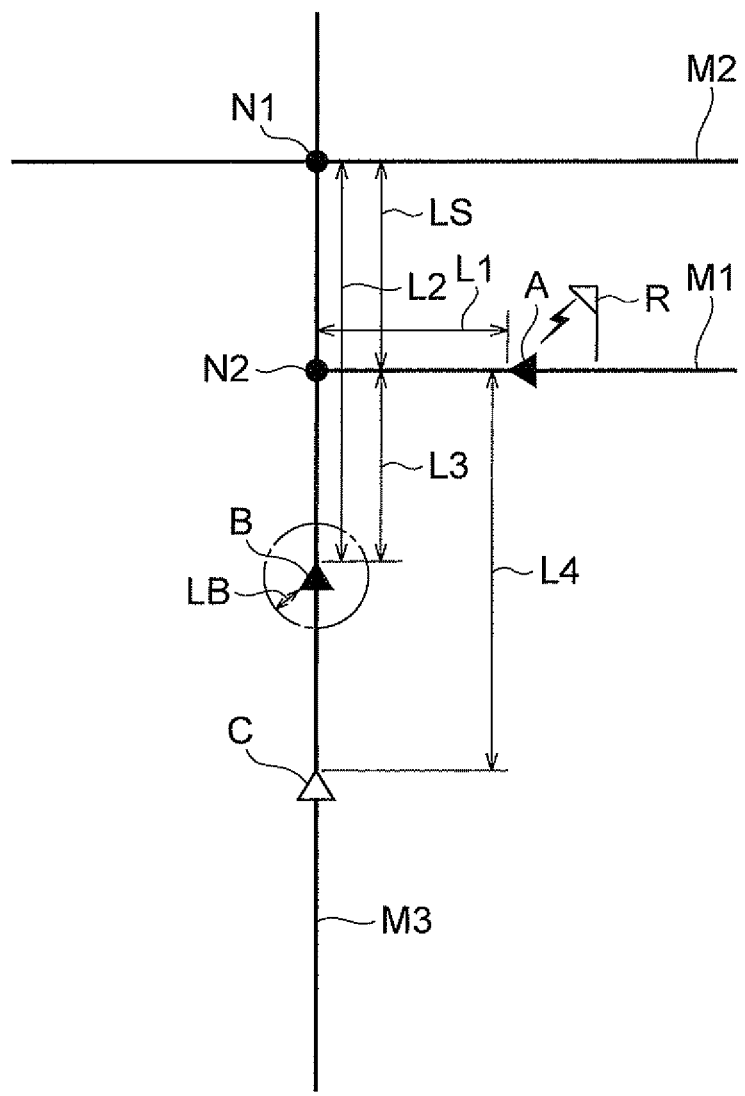
FIG. 2 is a diagram illustrating the positional relationship between vehicles.

As shown in FIGS. 1 and 2, a vehicle-mounted information processing apparatus 1 according to a first embodiment is provided in a vehicle, processes various kinds of information acquired by the vehicle, and includes an ECU [Electric Control Unit] 10 that controls the overall operation of the vehicle-mounted information processing apparatus 1. The ECU 10 includes a map information storage unit (map information storage means) 11 that stores map information including the positional information of roads and intersection points.

Figure 3:
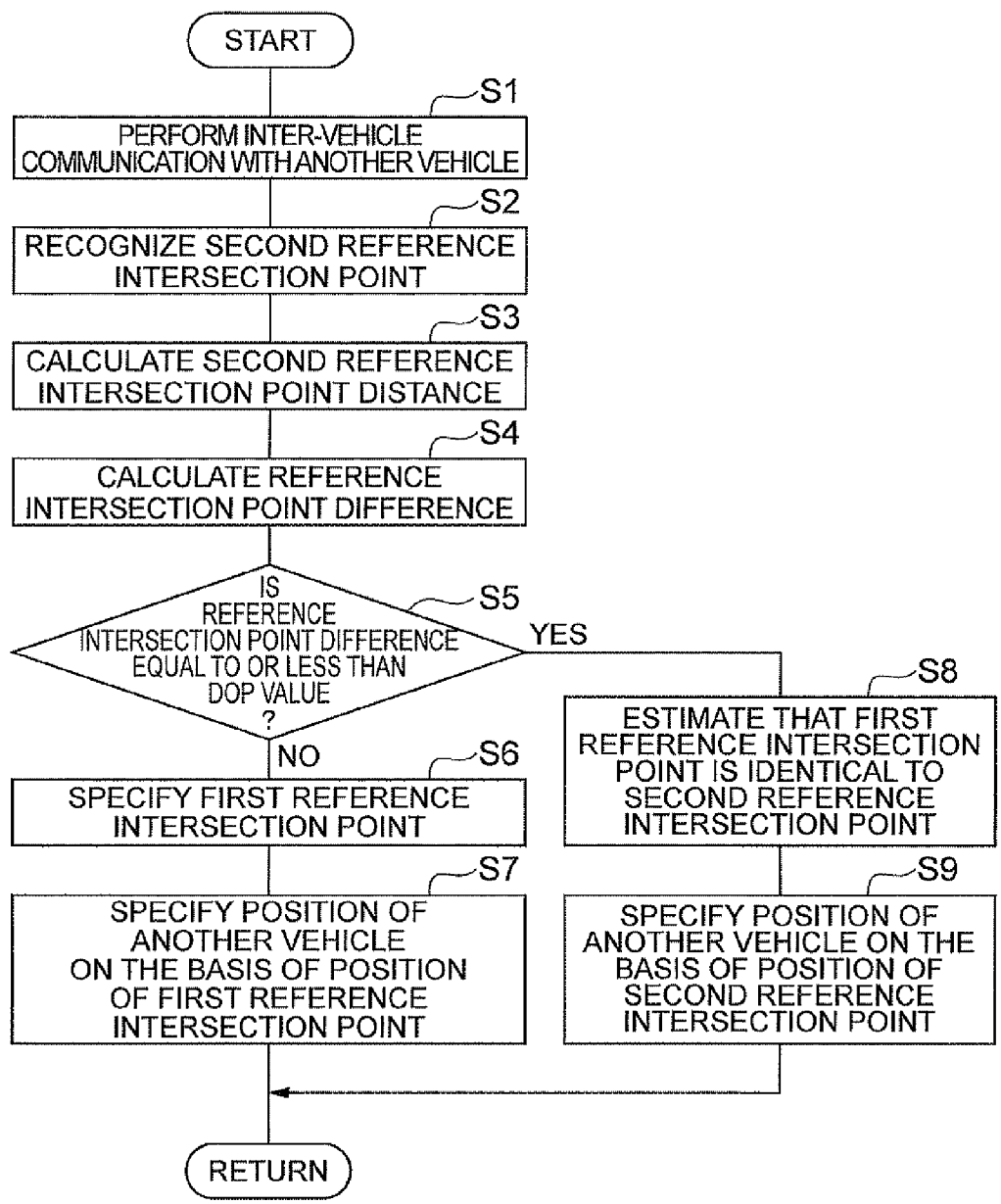
FIG. 3 is a flowchart illustrating the operation of an ECU shown in FIG. 1.

A vehicle A and a vehicle B shown in FIGS. 2 and 3 each have the vehicle-mounted information processing apparatus 1. The map information of the vehicle A includes information related to a road M1 on which the vehicle A travels, a road M2 that extends in parallel to the road M1, a road M3 perpendicular to the roads M1 and M2, an intersection point N1 between the road M2 and the road M3, and an intersection point N2 between the road M1 and the road M3 (see FIG. 2). The map information of the vehicle B includes information related to the road M3 on which the vehicle B travels and information relates to the road M2 and the intersection point N1, but does not include the information related to the road M1 on which the vehicle A travels and the intersection point N2 (see FIG. 5). In this embodiment, the vehicle A is referred to as a host vehicle and the vehicle B is referred to as another vehicle.

The ECU 10 includes, for example, a CPU [Central Processing Unit] that performs arithmetic processing, a ROM [Read Only Memory] and a RAM [Random Access Memory], which are storage units, an input signal circuit, an output signal circuit, and a power supply circuit. The ECU 10 is electrically connected to a GPS [Global Positioning System] receiving unit 2, a road-to-vehicle communication unit (road-to-vehicle communication means) 3, an inter-vehicle communication unit (inter-vehicle communication means) 4, and a navigation output unit 5.

The GPS receiving unit 2 receives signals from a plurality of GPS satellites and obtains host vehicle GPS information and host vehicle GPS error information. The host vehicle GPS information includes information related to the position and direction (traveling direction) of the host vehicle A. In addition, the host vehicle GPS error information includes a DOP [Dilution Of Precision] value LA, that is, information related to a GPS error distance in the host vehicle GPS information (see FIG. 5). The GPS receiving unit 2 transmits the host vehicle GPS information and the host vehicle GPS error information to the ECU 10.

The road-to-vehicle communication unit 3 communicates with a road-side communication device R, such as an optical beacon provided on the road. The road-to-vehicle communication unit 3 performs road-to-vehicle communication to receive host vehicle reference intersection point distance information (third reference intersection point distance information) related to a distance L1 between the host vehicle A and a host vehicle reference intersection point (third reference intersection point) N2, which is an intersection point that is in front of the host vehicle A and is closest to the host vehicle A. The road-to-vehicle communication unit 3 transmits the host vehicle reference intersection point distance information to the ECU 10.

The inter-vehicle communication unit 4 communicates with another vehicle having an inter-vehicle communication function. The inter-vehicle communication unit 4 performs inter-vehicle communication with another vehicle B to receive another-vehicle GPS information, another-vehicle GPS error information, and first reference intersection point distance information. The another-vehicle GPS information includes information related to the position and direction (traveling direction) of another vehicle B. In addition, the another-vehicle GPS error information includes a DOP [Dilution Of Precision] value LB, that is, information related to a GPS error distance in the another-vehicle GPS information (see FIG. 2). The first reference intersection point distance information is information related to a distance L2 between another vehicle B and a first reference intersection point N1 which is recognized as an intersection point which is in front of the another vehicle B and is closest to the another vehicle B by another vehicle B. The first reference intersection point distance information does not include information related to the position of the first reference intersection point N1. The inter-vehicle communication unit 4 transmits the another-vehicle GPS information, the another-vehicle GPS error information, and the first reference intersection point distance information to the ECU 10. The inter-vehicle communication unit 4 transmits the host vehicle GPS information, the host vehicle GPS error information, and the host vehicle reference intersection point distance information transmitted from the ECU 10 to another vehicle B.

The navigation output unit 5 outputs various kinds of information processed by the ECU 10 to the driver, thereby guiding the driver. The navigation output unit 5 and the ECU 10 form a navigation system. The navigation output unit 5 includes a display that outputs information using images. When the host vehicle position information and another-vehicle position specify information are transmitted from the ECU 10, the navigation output unit 5 displays a map in the vicinity of the host vehicle on the display on the basis of map information, host vehicle position information, and another-vehicle position specification information and displays the positions of the host vehicle A and another vehicle B on the map.

The ECU 10 includes a map information storage unit 11, a host vehicle position recognizing unit 12, an another-vehicle GPS information acquiring unit (a GPS information acquiring means, a GPS error information acquiring means, and a first reference intersection point information acquiring means) 13, a distance calculating unit (a second reference intersection point distance calculating means and a reference intersection point difference calculating means) 14, a reference intersection point position specifying unit (first reference intersection point position specifying means) 15, and an another-vehicle position specifying unit 16. The map information storage unit 11 stores map information including the position information of the road and the position information of the intersection point.

The host vehicle position recognizing unit 12 acquires the host vehicle GPS information and the host vehicle GPS error information transmitted from the GPS receiving unit 2 and acquires the host vehicle reference intersection point distance information transmitted from the road-to-vehicle communication unit 3. The host vehicle position recognizing unit 12 recognizes the position of the host vehicle A on the map on the basis of the acquired host vehicle GPS information, host vehicle GPS error information, and host vehicle reference intersection point distance information, and the map information stored in the map information storage unit 11. The host vehicle position recognizing unit 12 transmits the host vehicle position information related to the recognized position of the host vehicle A to the navigation output unit 5. The host vehicle position recognizing unit 12 transmits the acquired host vehicle GPS information, host vehicle GPS error information, and host vehicle reference intersection point distance information to the inter-vehicle communication unit 4.

The another-vehicle GPS information acquiring unit 13 acquires the another-vehicle GPS information, the another-vehicle GPS error information, and the first reference intersection point distance information transmitted from the inter-vehicle communication unit 4. The another-vehicle GPS information acquiring unit 13 recognizes the position and direction (traveling direction) of another vehicle B from the acquired another-vehicle GPS information. The another-vehicle GPS information acquiring unit 13 recognizes the DOP value LB from the acquired another-vehicle GPS error information. The another-vehicle GPS information acquiring unit 13 recognizes the distance L2 between the first reference intersection point N1 and another vehicle B from the first reference intersection point distance information. In addition, the another-vehicle GPS information acquiring unit 13 recognizes the position of the second reference intersection point N2, which is an intersection point that is in front of another vehicle B and is closest to another vehicle B, on the basis of the position and direction of another vehicle B recognized from the another-vehicle GPS information and the map information stored in the map information storage unit 11.

The distance calculating unit 14 calculates the distance L3 between the second reference intersection point N2 and another vehicle B using the position of another vehicle B and the second reference intersection point N2 recognized by the another-vehicle GPS information acquiring unit 13. In addition, the distance calculating unit 14 calculates a reference intersection point difference LS, which is the difference between the distance L2 between the first reference intersection point N1 and another vehicle B and the distance L3 between the second reference intersection point N2 and another vehicle B.

The reference intersection point position specifying unit 15 determines whether the reference intersection point difference LS calculated by the distance calculating unit 14 is equal to or less than the DOP value LB of the another-vehicle GPS error information recognized by the another-vehicle GPS information acquiring unit 13. When it is determined that the reference intersection point difference LS is more than the DOP value LB of the another-vehicle GPS error information recognized by the another-vehicle GPS information acquiring unit 13, the reference intersection point position specifying unit 15 determines that the first reference intersection point N1 is different from the second reference intersection point N2, that is, the map information of the host vehicle A is different from the map information of another vehicle B. When it is determined that the first reference intersection point N1 is different from the second reference intersection point N2, the reference intersection point position specifying unit 15 specifies the position of the first reference intersection point N1 that is recognized by another vehicle B as an intersection point which is in front of another vehicle B and is closest to another vehicle B, on the basis of the map information, the another-vehicle GPS information, and the first reference intersection point distance information. Specifically, the reference intersection point position specifying unit 15 determines an intersection point, which is in front of another vehicle B and is the distance L2 away from another vehicle B on the map, to be the first reference intersection point N1 and specifies the position of the first reference intersection point N1.

When it is determined that the reference intersection point difference LS is equal to or less than the DOP value LB of the another-vehicle GPS error information recognized by the another-vehicle GPS information acquiring unit 13, the reference intersection point position specifying unit 15 estimates that the first reference intersection point N1 is identical to the second reference intersection point N2.

When the reference intersection point position specifying unit 15 specifies the first reference intersection point N1, the another-vehicle position specifying unit 16 specifies the position of another vehicle B on the basis of the position of the first reference intersection point N2 specified by the reference intersection point position specifying unit 15, the map information stored in the map information storage unit 11, the position of another vehicle B recognized by the another-vehicle GPS information acquiring unit 13, and the distance L2 between the first reference intersection point N1 and another vehicle B. Specifically, the another-vehicle position specifying unit 16 corrects the position of another vehicle B to a position that is the distance L2 away from the first reference intersection point N1 on the map, on the basis of the position of the first reference intersection point N1 specified by the reference intersection point position specifying unit 15, thereby specifying the position of another vehicle B.

When the reference intersection point position specifying unit 15 estimates that the first reference intersection point N1 is identical to the second reference intersection point N2, the another-vehicle position specifying unit 16 specifies the position of another vehicle B on the basis of the map information stored in the map information storage unit 11, the position of the second reference intersection point N2 recognized by the another-vehicle GPS information acquiring unit 13, the distance L2 between the first reference intersection point N1 and another vehicle B, and the position of another vehicle B. Specifically, the another-vehicle position specifying unit 16 corrects the position of another vehicle B to a position that is the distance L2 away from the second reference intersection point N2 on the map on the basis of the position of the second reference intersection point N2 calculated by the distance calculating unit 14, thereby specifying the position of another vehicle B.

Next, the operation of the ECU 10 in the vehicle-mounted information processing apparatus 1 will be described with reference to the drawings.

As shown in FIGS. 2 and 3, first, the inter-vehicle communication unit 4 of the vehicle-mounted information processing apparatus 1 performs inter-vehicle communication with another vehicle B (S1). The inter-vehicle communication unit 4 performs inter-vehicle communication with another vehicle B to receive the another-vehicle GPS information, the another-vehicle GPS error information, and the first reference intersection point distance information. The inter-vehicle communication unit 4 transmits the received another-vehicle GPS information, another-vehicle GPS error information, and first reference intersection point distance information to the ECU 10.

The another-vehicle GPS information acquiring unit 13 of the ECU 10 acquires the another-vehicle GPS information, the another-vehicle GPS error information, and the first reference intersection point distance information transmitted from the inter-vehicle communication unit 4. The another-vehicle GPS information acquiring unit 13 recognizes the position of the second reference intersection point N2, which is an intersection point that is in front of another vehicle B and is closest to another vehicle B, on the basis of the map information stored in the map information storage unit 11 and the position and direction of another vehicle B recognized from the another-vehicle GPS information (S2).

The distance calculating unit 14 calculates the distance L3 between the second reference intersection point N2 and another vehicle B on the basis of the position of another vehicle B and the second reference intersection point N2 recognized by the another-vehicle GPS information acquiring unit 13 (S3). Then, the distance calculating unit 14 calculates the reference intersection point difference LS, which is the difference between the distance L2 between the first reference intersection point N1 and another vehicle B and the distance L3 between the second reference intersection point N2 and another vehicle B (S4).

Then, the reference intersection point position specifying unit 15 determines whether the reference intersection point difference LS calculated by the distance calculating unit 14 is equal to or less than the DOP value LB of the another-vehicle GPS error information recognized by the another-vehicle GPS information acquiring unit 13 (S5). When it is determined that the reference intersection point difference LS is more than the DOP value LB of the another-vehicle GPS error information recognized by the another-vehicle GPS information acquiring unit 13, the reference intersection point position specifying unit 15 map information specifies the position of the first reference intersection point N1 that is recognized by another vehicle B as an intersection point which is in front of another vehicle B and is closest to another vehicle B, on the basis of the another-vehicle GPS information and the first reference intersection point distance information (S6).

Then, the another-vehicle position specifying unit 16 specifies the position of another vehicle B relative to the position of the first reference intersection point N1, on the basis of the position of the first reference intersection point N2 specified by the reference intersection point position specifying unit 15, the map information stored in the map information storage unit 11, the position of another vehicle B recognized by the another-vehicle GPS information acquiring unit 13, and the distance L2 between the first reference intersection point N1 and another vehicle B (S7).

On the other hand, when it is determined that the reference intersection point difference LS is equal to or less than the DOP value LB of the another-vehicle GPS error information recognized by the another-vehicle GPS information acquiring unit 13, the reference intersection point position specifying unit 15 estimates that the first reference intersection point N1 is identical to the second reference intersection point N2 (S8). Then, the another-vehicle position specifying unit 16 specifies the position of another vehicle B relative to the position of the second reference intersection point N2, on the basis of the map information stored in the map information storage unit 11, the position of the second reference intersection point N2 recognized by the another-vehicle GPS information acquiring unit 13, the distance L2 between the first reference intersection point N1 and another vehicle B, and the position of another vehicle B (S9).

According to the vehicle-mounted information processing apparatus 1 of the first embodiment, map matching using map information is performed on the GPS information acquired from another vehicle B by inter-vehicle communication. In this way, it is possible to specify the position of another vehicle B. In addition, the position of another vehicle B is corrected with respect to the position of the first reference intersection point N1 using the map information and the first reference intersection point distance information acquired by inter-vehicle communication. Therefore, it is possible to specify the position of another vehicle B with high accuracy.

According to the vehicle-mounted information processing apparatus 1, it is possible to recognize the DOP value LA from the another-vehicle GPS error information, that is, it is possible to recognize the range of an error in the another-vehicle GPS information. It is possible to prevent excessive correction over the error range. Specifically, in the vehicle-mounted information processing apparatus 1, even when information related to the road M1 or the intersection point N2 is not included in the map information of another vehicle B, it is possible to determine that the first reference intersection point recognized by another vehicle B is different from the second reference intersection point recognized by the host vehicle A by determining whether the reference intersection point difference LS is within the GPS error distance. Therefore, in the vehicle-mounted information processing apparatus 1, it is possible to prevent the distance L2 between the intersection point N1 and another vehicle B in the first reference intersection point distance information from being recognized as the distance L4 between the intersection point N2 and the another vehicle B and thus prevent a position C shown in FIG. 2 from being erroneously recognized as the position of another vehicle B.

In the vehicle-mounted information processing apparatus 1, the first reference intersection point recognized by another vehicle is specified on the basis of the map information and the GPS information of another vehicle, and the position of another vehicle is corrected with respect to the position of the specified first reference intersection point using the first reference intersection point distance information. In this way, it is possible to specify the position of another vehicle with high accuracy. As a result, in the vehicle-mounted information processing apparatus 1, the specified position information of another vehicle is used to predict, for example, the possibility of a crash with high accuracy. This makes it possible to accurately select only the vehicle that is more likely to crash. Therefore, it is possible to prevent the transmission of signals to attract attention to the vehicle that is less likely to crash using inter-vehicle communication and thus reduce the feeling of discomfort of the driver due to unnecessary communication.

Second Embodiment

Figure 4:
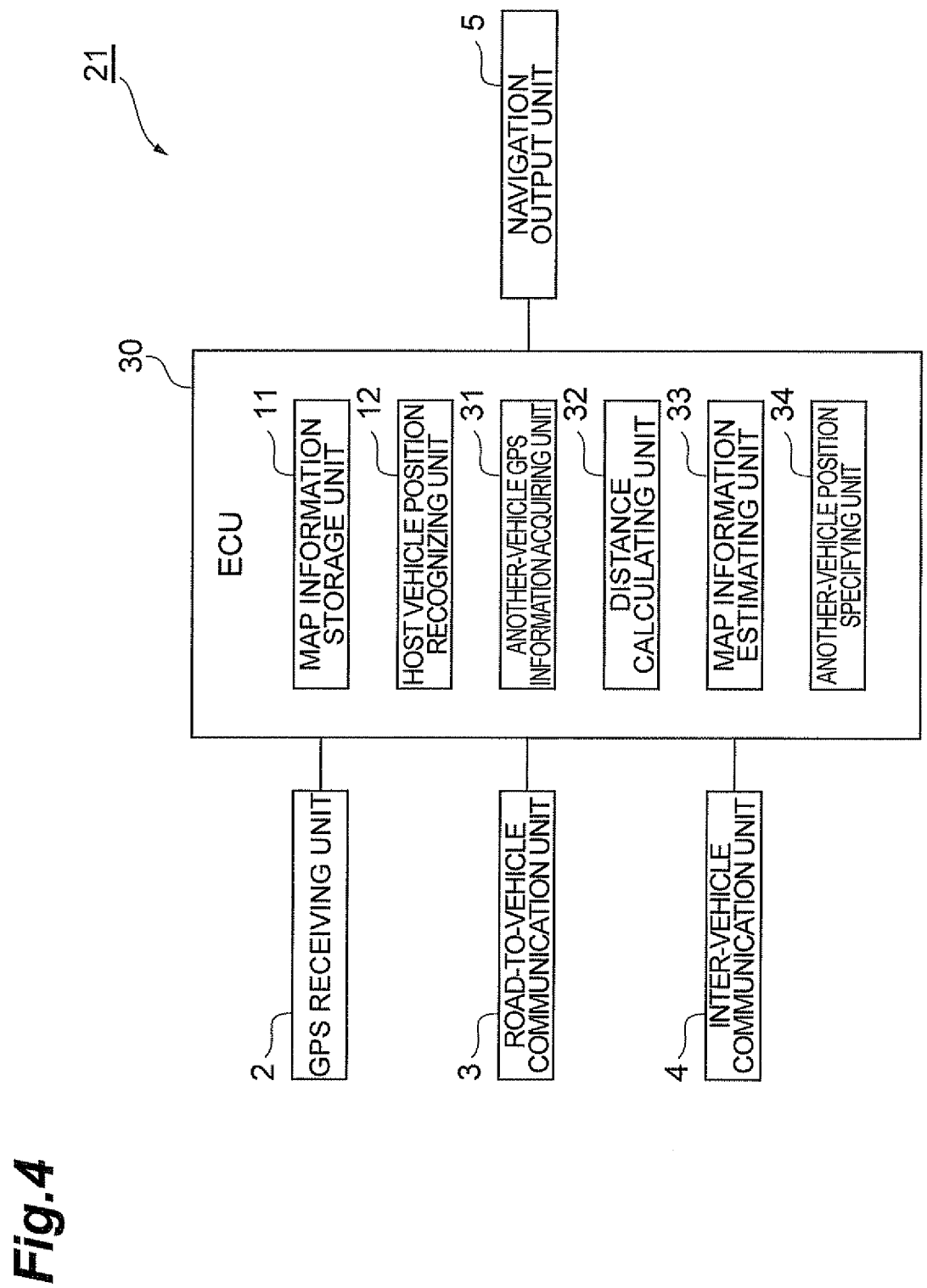
FIG. 4 is a block diagram illustrating a vehicle-mounted information processing apparatus according to a second embodiment.

Next, a vehicle-mounted information processing apparatus 21 according to a second embodiment will be described with reference to the drawings. As shown in FIG. 4, a vehicle-mounted information processing apparatus 21 according to the second embodiment differs from that according to the first embodiment in that the ECU 30 includes a map information estimating unit 33 instead of the reference intersection point position specifying unit 15 and an another-vehicle GPS information acquiring unit 31, a distance calculating unit (shortest road distance calculating means) 32, and an another-vehicle position specifying unit 34 have different functions.

In the second embodiment, the vehicle A and the vehicle B described in the first embodiment are referred to as another vehicle and a host vehicle, respectively. The map information of another vehicle A includes information related to a road M1 on which another vehicle A travels, a road M2 that extends in parallel to the road M1, a road M3 perpendicular to the roads M1 and M2, an intersection point N1 between the road M2 and the road M3, and an intersection point N2 between the road M1 and the road M3 (see FIG. 2). The map information of the host vehicle B includes information related to the road M3 on which the host vehicle B travels, the road M2, and the intersection point N1, but does not include the information related to the road M1 on which the vehicle A travels and the intersection point N2 (see FIG. 5).

Figure 5:
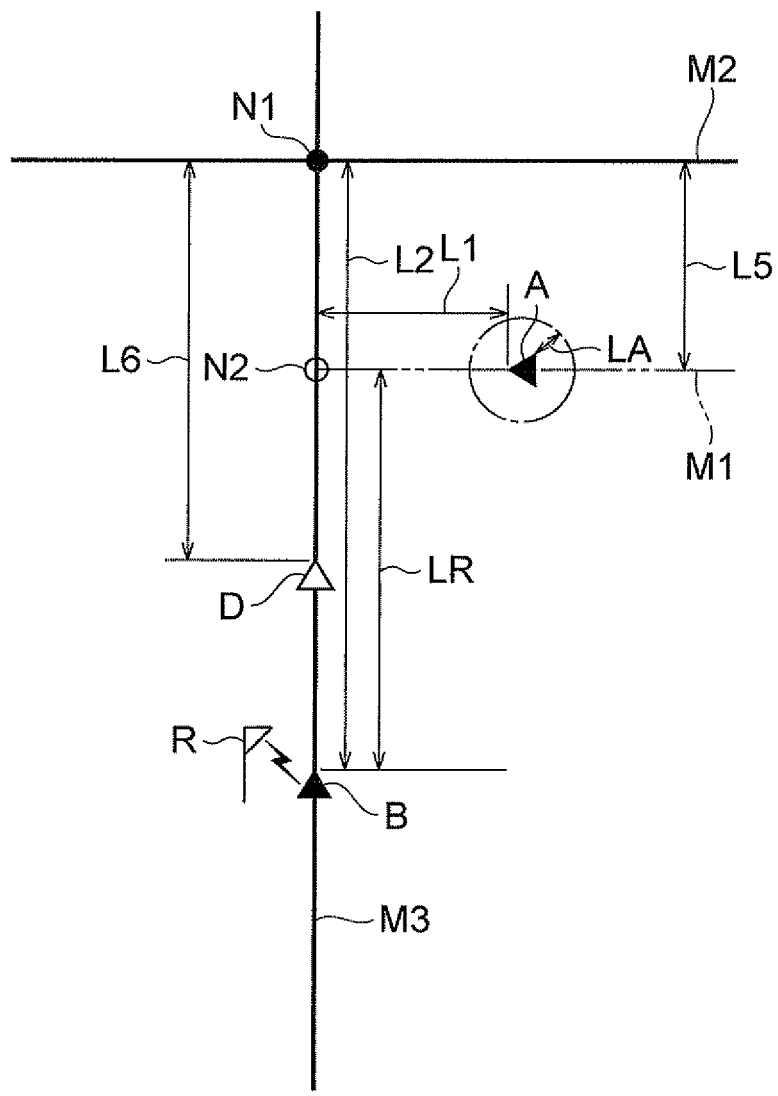
FIG. 5 is a diagram illustrating the positional relationship between vehicles.

As shown in FIGS. 4 and 5, the vehicle-mounted information processing apparatus 21 included in the host vehicle B receives host vehicle reference intersection point distance information (third reference intersection point distance information) related to the distance L3 between the host vehicle B and a host vehicle reference intersection point (third reference intersection point) N2, which is an intersection point that is in front of the host vehicle B and is closest to the host vehicle B, using road-to-vehicle communication by the road-to-vehicle communication unit 3. The road-to-vehicle communication unit 3 transmits the host vehicle reference intersection point distance information to the ECU 30. The road-to-vehicle communication unit 3 and the ECU 30 form a road-to-vehicle communication means described in the claims. The host vehicle B receives only the host vehicle reference intersection point distance information related to the distance L3 using road-to-vehicle communication, but does not receive information related to the position of the host vehicle reference intersection point N2.

The inter-vehicle communication unit 4 performs inter-vehicle communication with another vehicle A to receive another-vehicle GPS information, another-vehicle GPS error information, and first reference intersection point distance information. The another-vehicle GPS information, the another-vehicle GPS error information, and the first reference intersection point distance information received by the host vehicle B correspond to the host vehicle GPS information, the host vehicle GPS error information, and the host vehicle reference intersection point distance information according to the first embodiment, respectively. The first reference intersection point according to the second embodiment corresponds to the intersection point N1 shown in FIG. 2. The inter-vehicle communication unit 4 transmits the received another-vehicle GPS information, another-vehicle GPS error information, and first reference intersection point distance information to the ECU 30. The inter-vehicle communication unit 4 and the ECU 30 form an inter-vehicle communication means described in the claims.

The another-vehicle GPS information acquiring unit 31 acquires the another-vehicle GPS information, the another-vehicle GPS error information, and the first reference intersection point distance information transmitted from the inter-vehicle communication unit 4. The another-vehicle GPS information acquiring unit 31 determines whether the position of another vehicle A is on a known road included in the map information on the basis of the another-vehicle GPS information transmitted and acquired from the inter-vehicle communication unit 4 and the map information stored in the map information storage unit 11.

When the another-vehicle GPS information acquiring unit 31 determines that the position of another vehicle A is not on a known road, the distance calculating unit 32 calculates the shortest road distance L5, which is the shortest distance between the position of another vehicle A in the another-vehicle GPS information and the position of another vehicle A on the map.

The map information estimating unit 33 determines whether the shortest road distance L5 calculated by the distance calculating unit 32 is equal to or less than the DOP value LA of the another-vehicle GPS error information recognized by the another-vehicle GPS information acquiring unit 31.

When it is determined that the shortest road distance L5 is equal to or less than the DOP value LA of the another-vehicle GPS error information, the map information estimating unit 33 determines that another vehicle A travels on the road that is not included in the map information of the host vehicle B. When it is determined that another vehicle A travels on the road that is not included in the map information of the host vehicle B, the map information estimating unit 33 estimates whether the road M1 and the intersection point N2 are present on the basis of the position and direction of another vehicle A in the another-vehicle GPS information recognized by the another-vehicle GPS information acquiring unit 31 and the map information stored in the map information storage unit 11. Specifically, the map information estimating unit 33 determines whether the position of the distance L1 is on the road M2 on which the host vehicle B travels in front of another vehicle A on the map. When it is determined that the position of the distance L1 is on the road M2 in front of another vehicle A, the map information estimating unit 33 determines that the intersection point N2 is present at the position and estimates the existence and position of the road M1 linking the intersection point N2 and another vehicle A and the intersection point N2. The map information estimating unit 33 temporarily adds information related to the estimated road M1 and intersection point N2 to the map information stored in the map information storage unit 11. The determination whether the position of the distance L1 is on the road M2 in front of another vehicle A includes a case in which the road M2 is present in a predetermined range (for example, in the range of the DOP value LA) having the position of the distance L1 in front of another vehicle A as the center.

When the map information estimating unit 33 estimates the existence of the road M1 and the intersection point N2, the another-vehicle position specifying unit 34 specifies the position of another vehicle A on the estimated road M1 on the basis of the map information to which the information related to the road M1 and the intersection point N2 is added, the another-vehicle GPS information, the another-vehicle GPS error information, and the first reference intersection point distance information.

When the another-vehicle GPS information acquiring unit 31 determines that the position of another vehicle A is on a known road or when the map information estimating unit 33 determines that the shortest road distance L5 is more than the DOP value LA of the another-vehicle GPS error information, the another-vehicle position specifying unit 34 specifies the position of another vehicle A on the known road M2 using the another-vehicle position specifying method (for example, the method using map matching) according to the related art or the method according to the first embodiment.

Next, the operation of the ECU 30 in the vehicle-mounted information processing apparatus 21 will be described with reference to the drawings.

As shown in FIGS. 5 and 6, first, the inter-vehicle communication unit 4 of the vehicle-mounted information processing apparatus 21 performs inter-vehicle communication with another vehicle A (S11). The inter-vehicle communication unit 4 receives the another-vehicle GPS information, the another-vehicle GPS error information, and the first reference intersection point distance information using inter-vehicle communication with another vehicle A. The inter-vehicle communication unit 4 transmits the received another-vehicle GPS information, another-vehicle GPS error information, and first reference intersection point distance information to the ECU 30.

The another-vehicle GPS information acquiring unit 31 of the ECU 10 acquires the another-vehicle GPS information, the another-vehicle GPS error information, and the first reference intersection point distance information transmitted from the inter-vehicle communication unit 4. The another-vehicle GPS information acquiring unit 31 determines whether the position of another vehicle A is on a known road on the basis of the another-vehicle GPS information transmitted and acquired from the inter-vehicle communication unit 4 and the map information stored in the map information storage unit 11 (S12). When the another-vehicle GPS information acquiring unit 31 determines that the position of another vehicle A is on the known road, the process proceeds to Step S15.

When the another-vehicle GPS information acquiring unit 31 determines that the position of another vehicle A is not on the known road, the distance calculating unit 32 calculates the shortest road distance L5, which is the shortest distance between the position of another vehicle A in the another-vehicle GPS information and the road that is closest to the position of another vehicle A on the map (S13).

Then, the map information estimating unit 33 determines whether the shortest road distance L5 calculated by the distance calculating unit 32 is equal to or less than the DOP value LA of the another-vehicle GPS error information recognized by the another-vehicle GPS information acquiring unit 31 (S14). When it is determined that the map information estimating unit 33 determines that the shortest road distance L5 is more than the DOP value LA of the another-vehicle GPS error information, the process proceeds to Step S15.

In Step S15, the another-vehicle position specifying unit 34 specifies the position of another vehicle A on the known road using the another-vehicle position specifying method according to the related art or the method according to the first embodiment.

On the other hand, when it is determined that the shortest road distance L5 is equal to or less than the DOP value LA of the another-vehicle GPS error information, the map information estimating unit 33 estimates the existence of the road M1 and the intersection point N2 on the basis of the position and direction of another vehicle A in the another-vehicle GPS information recognized by the another-vehicle GPS information acquiring unit 31 and the map information stored in the map information storage unit 11 (S16). The map information estimating unit 33 temporarily adds information related to the estimated road M1 and intersection point N2 to the map information stored in the map information storage unit 11.

When the map information estimating unit 33 estimates the existence of the road M1 and the intersection point N2, the another-vehicle position specifying unit 34 specifies the position of another vehicle A on the basis of the map information to which the information related to the road M1 and the intersection point N2 is added, the another-vehicle GPS information, the another-vehicle GPS error information, and the first reference intersection point distance information (S17).

According to the vehicle-mounted information processing apparatus 21 of the second embodiment, when the shortest road distance L5 of another vehicle A is more than the DOP value LA, it is determined that another vehicle travels on the road that is not included in the map information of the host vehicle, and the existence of new intersection point N2 and road M1 is estimated from the another-vehicle GPS information and the map information. Then, the information related to the estimated intersection point N2 and road M1 is added to the map information. In this way, it is possible to update the map information. In addition, the position of another vehicle A is specified on the estimated road M1. Therefore, it is possible to prevent the position of another vehicle A from being forcibly corrected on the known road M2 and thus specify the position of another vehicle with high reliability.

The invention is not limited to the above-described embodiments. For example, in the second embodiment, the map information estimating unit 33 may acquire the host vehicle reference intersection point distance information transmitted from the road-to-vehicle communication unit 3 and estimate the position of a new intersection point N2 on the basis of the host vehicle reference intersection point distance information, the another-vehicle GPS information, and the map information. Specifically, when the position of the distance L1 is on the road M2 in front of another vehicle A on the map, the map information estimating unit 33 determines whether the position is in the vicinity of the position of the distance L3 in the host vehicle reference intersection point distance information in front of the host vehicle B. When the position of the distance L1 is on the road M2 in front of another vehicle A and the position is in the vicinity of the position of the distance L3 in front of the host vehicle B, the map information estimating unit 33 estimates the existence and position of the intersection point N2 that is corrected on the basis of the distance L3 in the host vehicle reference intersection point distance information acquired by road-to-vehicle communication. Then, the map information estimating unit 33 estimates the existence and position of the road M1 linking the estimated intersection point N2 and another vehicle A and the intersection point N2.

In this case, as shown in FIG. 5, it is possible to prevent the host vehicle B from recognizing the distance LR between the host vehicle B and the intersection point N2 received by road-to-vehicle communication as the distance L6 between the intersection point N1 and the host vehicle B and mistaking the position of the host vehicle B as a position D. In addition, according to the vehicle-mounted information processing apparatus 21, the existence of the new intersection point N2 and the road M1 is estimated on the basis of the host vehicle reference intersection point distance information obtained by road-to-vehicle communication, in addition to the another-vehicle GPS information and the map information. Therefore, it is possible to estimate the intersection point N2 and the road M1 with high reliability. As a result, it is possible to improve the reliability of specifying the position of another vehicle.

The map information estimating unit 33 may estimate the existence of a new intersection point and the road on the basis of the another-vehicle GPS information of a plurality of other vehicles. In this case, it is possible to estimate the existence of the intersection point and the road with higher reliability.

In the above-described embodiments, the third reference intersection point distance information is acquired by road-to-vehicle communication, but the invention is not limited thereto. The third reference intersection point distance information may be calculated from the position of the intersection point and the position of the host vehicle on the map data of a navigation system, or the distance between the intersection point and the host vehicle may be calculated from the image of the front of the host vehicle captured by an in-vehicle camera.

REFERENCE SIGNS LIST 1, 21: VEHICLE-MOUNTED INFORMATION PROCESSING APPARATUS
2: GPS RECEIVING UNIT
3: ROAD-TO-VEHICLE COMMUNICATION UNIT (ROAD-TO-VEHICLE COMMUNICATION MEANS)
4: INTER-VEHICLE COMMUNICATION UNIT (INTER-VEHICLE COMMUNICATION MEANS)
10, 30: ECU
11: MAP INFORMATION STORAGE UNIT (MAP INFORMATION STORAGE MEANS)
13: ANOTHER-VEHICLE GPS INFORMATION ACQUIRING UNIT (GPS INFORMATION ACQUIRING MEANS, GPS ERROR INFORMATION ACQUIRING MEANS, AND FIRST REFERENCE INTERSECTION POINT INFORMATION ACQUIRING MEANS)
14, 32: DISTANCE CALCULATING UNIT (SECOND REFERENCE INTERSECTION POINT DISTANCE CALCULATING MEANS, REFERENCE INTERSECTION POINT DIFFERENCE CALCULATING MEANS, AND SHORTEST ROAD DISTANCE CALCULATING MEANS)
15: REFERENCE INTERSECTION POINT POSITION SPECIFYING UNIT (FIRST REFERENCE INTERSECTION POINT POSITION SPECIFYING MEANS)

The invention claimed is:

1. A vehicle-mounted information processing apparatus for mounting in a host vehicle, the apparatus comprising:
    map information storage means for storing map information including position information of a road and an intersection point;
    inter-vehicle communication means for acquiring various kinds of information using inter-vehicle communication with another vehicle;
    GPS information acquiring means for acquiring GPS information related to a position of the another vehicle through the inter-vehicle communication means;
    first reference intersection point distance information acquiring means for acquiring, through the inter-vehicle communication means, first reference intersection point distance information related to a distance between the another vehicle and a first reference intersection point which is an intersection point that is in front of the another vehicle and is closest to the another vehicle based on map information of the another vehicle;
    another-vehicle position specifying means for specifying the position of the another vehicle on the basis of the GPS information, the map information, and the first reference intersection point distance information;
    GPS error information acquiring means for acquiring GPS error information of the another vehicle through the inter-vehicle communication means, wherein the another-vehicle position specifying means specifies the position of the another vehicle on the basis of the GPS error information;
    second reference intersection point distance calculating means for calculating a distance between the another vehicle and a second reference intersection point, which is an intersection point that is in front of the another vehicle and is closest to the another vehicle, on the basis of the GPS information and the map information;
    reference intersection point difference calculating means for calculating a reference intersection point difference, which is a difference between the distance between the first reference intersection point and the another vehicle and the distance between the second reference intersection point and the another vehicle; and
    first reference intersection point position specifying means for specifying a position of the first reference intersection point on the basis of the GPS information and the map information in response to the reference intersection point difference being greater than a range of a GPS error distance in the GPS error information of the another vehicle acquired through the inter-vehicle communication means,
    wherein the another-vehicle position specifying means specifies the position of the another vehicle on the basis of information related to the position of the first reference intersection point in response to the first reference intersection point specifying means specifying the position of the first reference intersection point.

2. The vehicle-mounted information processing apparatus according to claim 1, further comprising:
shortest road distance calculating means for calculating a shortest road distance, which is the shortest distance between the position of the another vehicle in the GPS information and the road in the map information, when the position of the another vehicle in the GPS information is on a road other than a known road included in the map information; and
estimating means for estimating the existence of a new intersection point and road on the basis of the GPS information, the map information, and the first reference intersection point distance information when the shortest road distance is beyond a range of the GPS error distance in the GPS error information,
wherein the another-vehicle position specifying means specifies the position of the another vehicle on the road estimated by the estimating means.

3. The vehicle-mounted information processing apparatus according to claim 2, further comprising:
road-to-vehicle communication means for acquiring third reference intersection point distance information related to a distance between a host vehicle and a third reference intersection point, which is an intersection point that is in front of the host vehicle and is closest to the host vehicle, using road-to-vehicle communication with a road-side communication device,
wherein the estimating means estimates the existence of the new intersection point and road on the basis of the third reference intersection point distance information.

4. The vehicle-mounted information processing apparatus according to claim 1, wherein
the another-vehicle position specifying means specifies the position of the another vehicle on the basis of the GPS information, the map information, the first reference intersection point distance information, and second reference intersection point distance information of the second reference intersection point.

5. An information processing method for a host vehicle having an electronic control unit, the method being executed by the electronic control unit, the method comprising:
an acquiring step of acquiring GPS information related to a position of another vehicle, acquiring GPS error information of the another vehicle, and acquiring first reference intersection point distance information related to a distance between the another vehicle and a first reference intersection point which is an intersection point that is in front of the another vehicle and is closest to the another vehicle based on map information of the another vehicle, using inter-vehicle communication;
an another-vehicle position specifying step of specifying the position of the another vehicle on the basis of map information including position information of a road and an intersection point, the GPS information, and the first reference intersection point distance information, and specifying the position of the another vehicle on the basis of GPS error information,
a second reference intersection point distance calculating step of calculating a distance between the another vehicle and a second reference intersection point, which is an intersection point that is in front of the another vehicle and is closest to the another vehicle, on the basis of the GPS information and the map information;
a reference intersection point difference calculating step of calculating a reference intersection point difference, which is a difference between the distance between the first reference intersection point and the another vehicle and the distance between the second reference intersection point and the another vehicle; and
a first reference intersection point position specifying step of specifying a position of the first reference intersection point on the basis of the GPS information and the map information in response to the reference intersection point difference being greater than a range of a GPS error distance in the GPS error information of the another vehicle acquired using the inter-vehicle communication,
wherein, in the another-vehicle position specifying step, the position of the another vehicle is specified on the basis of information related to the position of the first reference intersection point in response to the position of the first reference intersection point being specified in the first reference intersection point specifying step.

6. The information processing method according to claim 5, further comprising:
a shortest road distance calculating step of calculating a shortest road distance, which is the shortest distance between the position of the another vehicle in the GPS information and the road in the map information, when the position of the another vehicle in the GPS information is on a road other than a known road included in the map information; and
an estimating step of estimating the existence of a new intersection point and road on the basis of the GPS information, the map information, and the first reference intersection point distance information when the shortest road distance is beyond a range of the GPS error distance in the GPS error information,
wherein, in the another-vehicle position specifying step, the position of the another vehicle is specified on the estimated road.

7. The information processing method according to claim 6, further comprising:
a road-to-vehicle communication step of acquiring third reference intersection point distance information related to a distance between a host vehicle and a third reference intersection point, which is an intersection point that is in front of the host vehicle and is closest to the host vehicle, using road-to-vehicle communication with a road-side communication device,
wherein, in the estimating step, the existence of the new intersection point and road is estimated on the basis of the third reference intersection point distance information.

8. The information processing method according to claim 5, wherein
the another-vehicle position specifying step specifies the position of the another vehicle on the basis of the GPS information, the map information, the first reference intersection point distance information, and second reference intersection point distance information of the second reference intersection point.

9. A vehicle-mounted information processing apparatus for mounting in a host vehicle, the apparatus comprising:
a map information storage unit configured to store map information including position information of a road and an intersection point;
an inter-vehicle communication unit configured to acquire various kinds of information using inter-vehicle communication with another vehicle;

a GPS information acquiring unit configured to acquire GPS information related to a position of the another vehicle through the inter-vehicle communication unit;

a first reference intersection point distance information acquiring unit configured to acquire, through the inter-vehicle communication unit, first reference intersection point distance information related to a distance between the another vehicle and a first reference intersection point which is an intersection point that is in front of the another vehicle and is closest to the another vehicle based on map information of the another vehicle;

an another-vehicle position specifying unit configured to specify the position of the another vehicle on the basis of the GPS information, the map information, and the first reference intersection point distance information;

a GPS error information acquiring unit configured to acquire GPS error information of the another vehicle through the inter-vehicle communication unit, wherein the another-vehicle position specifying unit specifies the position of the another vehicle on the basis of the GPS error information;

second reference intersection point distance calculating unit configured to calculate a distance between the another vehicle and a second reference intersection point, which is an intersection point that is in front of the another vehicle and is closest to the another vehicle, on the basis of the GPS information and the map information;

a reference intersection point difference calculating unit configured to calculate a reference intersection point difference, which is a difference between the distance between the first reference intersection point and the another vehicle and the distance between the second reference intersection point and the another vehicle; and a first reference intersection point position specifying unit configured to specify the position of the first reference intersection point on the basis of the GPS information and the map information in response to the reference intersection point difference being greater than a range of a GPS error distance in the GPS error information of the another vehicle acquired through the inter-vehicle communication unit, wherein the another-vehicle position specifying unit specifies the position of the another vehicle on the basis of information related to the position of the first reference intersection point in response to the position of the first reference intersection point being specified by the first reference intersection point specifying unit.

10. The vehicle-mounted information processing apparatus according to claim 9, further comprising:

a shortest road distance calculating unit configured to calculate a shortest road distance, which is the shortest distance between the position of the another vehicle in the GPS information and the road in the map information, when the position of the another vehicle in the GPS information is on a road other than a known road included in the map information; and an estimating unit configured to estimate the existence of a new intersection point and road on the basis of the GPS information, the map information, and the first reference intersection point distance information when the shortest road distance is beyond a range of a GPS error distance in the GPS error information, wherein the another-vehicle position specifying unit specifies the position of the another vehicle on the road estimated by the estimating unit.

11. The vehicle-mounted information processing apparatus according to claim 10, further comprising:

a road-to-vehicle communication unit configured to acquire third reference intersection point distance information related to a distance between a host vehicle and a third reference intersection point, which is an intersection point that is in front of the host vehicle and is closest to the host vehicle, using road-to-vehicle communication with a road-side communication device, wherein the estimating unit estimates the existence of the new intersection point and road on the basis of the third reference intersection point distance information.

12. The vehicle-mounted information processing apparatus according to claim 9, wherein the another-vehicle position specifying unit specifies the position of the another vehicle on the basis of the GPS information, the map information, the first reference intersection point distance information, and second reference intersection point distance information of the second reference intersection point.

* * * * *